L. H. DRAEGER.
EXCAVATING AND LOADING MACHINE.
APPLICATION FILED JAN. 10, 1920.
1,431,104.
Patented Oct. 3, 1922.
3 SHEETS—SHEET 2.
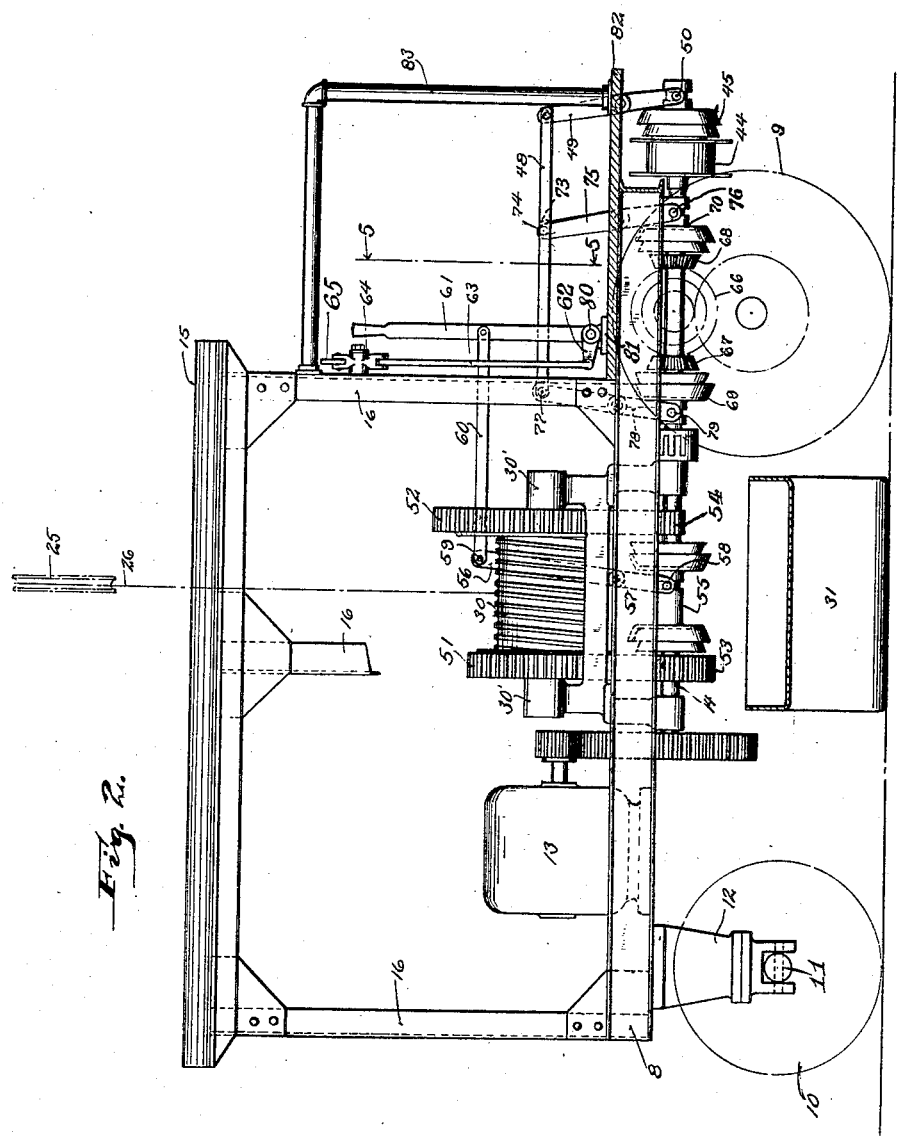

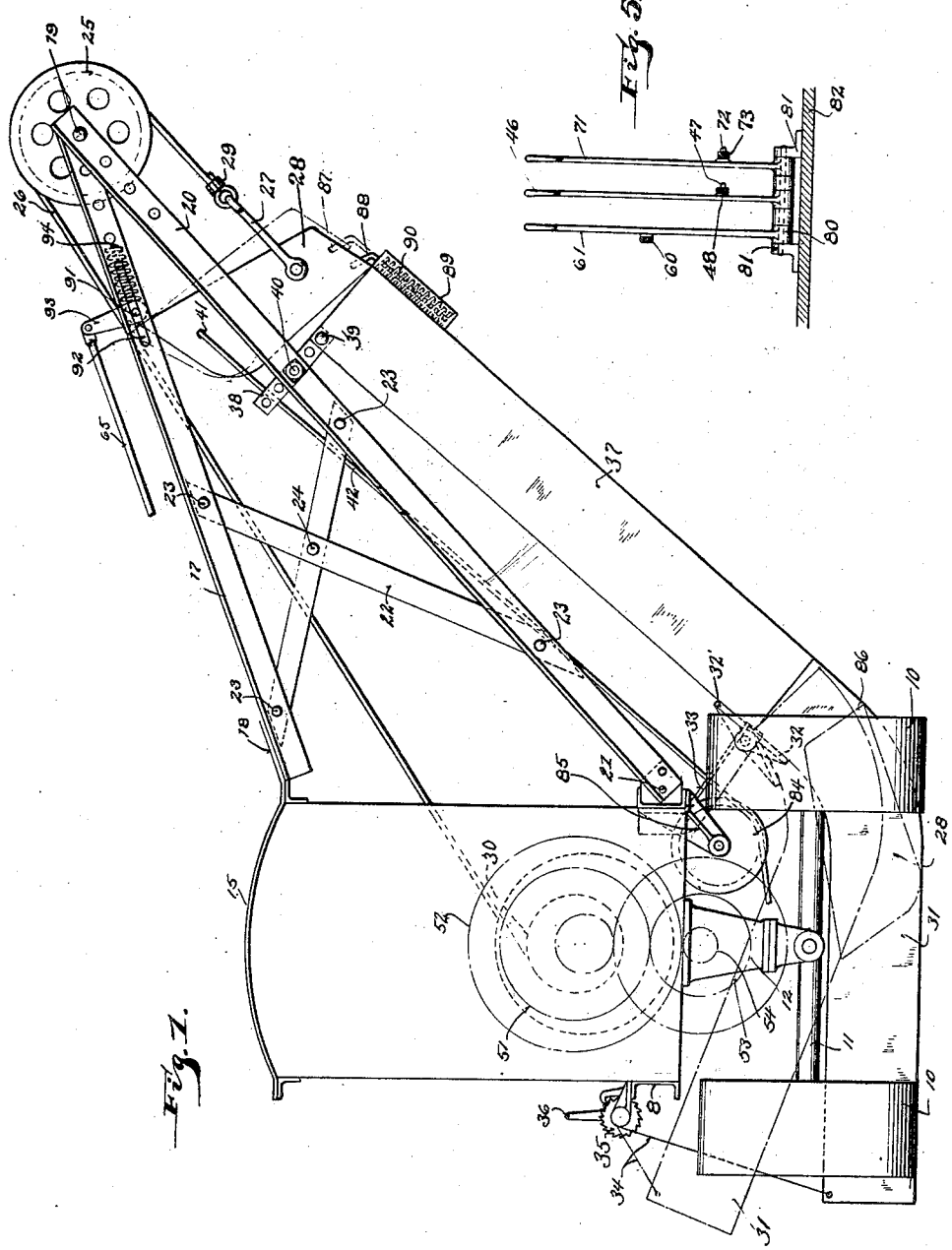

L. H. DRAEGER.
EXCAVATING AND LOADING MACHINE.
APPLICATION FILED JAN. 10, 1920.
1,431,104.
Patented Oct. 3, 1922.
3 SHEETS—SHEET 3.
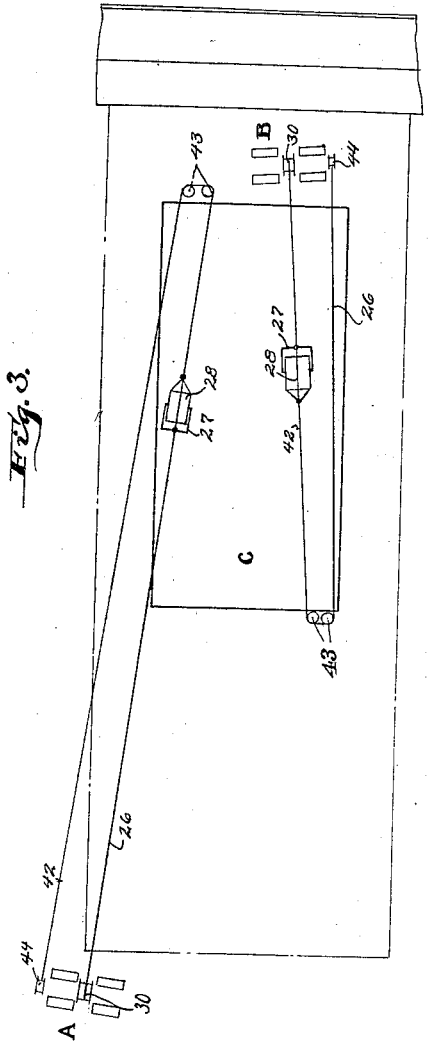
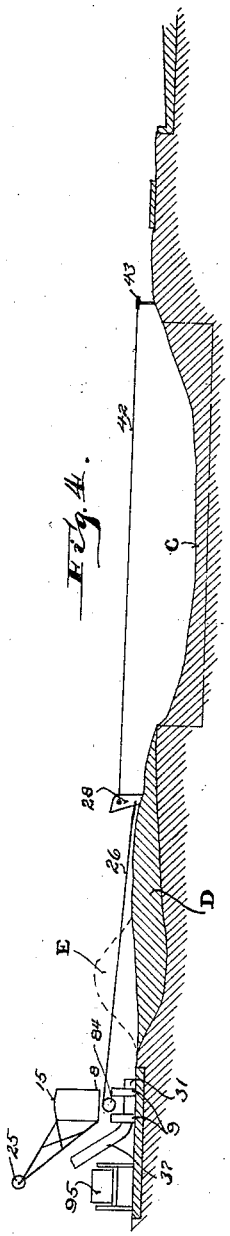
Inventor.
Lloyd H. Draeger,
By Morsell & Keeny,
Attorneys.

Patented Oct. 3, 1922.

1,431,104

UNITED STATES PATENT OFFICE.

LLOYD H. DRAEGER, OF MILWAUKEE, WISCONSIN, ASSIGNOR TO BADGER EXCAVATOR CO., OF MILWAUKEE, WISCONSIN.

EXCAVATING AND LOADING MACHINE.

Application filed January 10, 1920. Serial No. 350,621.

*To all whom it may concern:*

Be it known that I, LLOYD H. DRAEGER, a citizen of the United States, and resident of Milwaukee, in the county of Milwaukee and State of Wisconsin, have invented new and useful Improvements in Excavating and Loading Machines, of which the following is a description, reference being had to the accompanying drawings, which are a part of this specification.

The present invention relates to certain new and useful improvements in excavating and loading machines, and has for one of its objects to provide a machine of this class which may be readily moved from place to place, and which, if desired, may be transported under its own power.

Another object of this invention is to provide a machine of the class described which may be employed in excavating and back filling, or which may be employed for loading cars, wagons or the like.

A further object of this invention is to provide a machine of the class described adapted for use in connection with mixing machines, the discharge end of the inclined skip-way, as hereinafter described, being then positioned adjacent the hopper of the mixing machine.

A still further object of this invention is to provide a portable machine of the class described which will have a two speed hoisting drum in connection with an excavating scoop whereby the same may be worked more rapidly when employed for moving loose materials, or whereby the same may be worked more slowly when employed in connection with substantially solid materials.

With the above and other objects in view which will appear as the description proceeds, my invention resides in the novel construction, combination and arrangement of parts substantially as hereinafter described and more particularly defined by the appended claims, it being understood that such changes in the precise embodiment of the hereindisclosed invention may be made as come within the scope of the claims.

In the accompanying drawings I have illustrated one complete example of the physical embodiment of my invention constructed according to the best mode I have so far devised for the practical application of the principles thereof, and in which:

Fig. 1 is an end view of the main frame or power plant of my invention.

Fig. 2 is a side plan view thereof, the crane being removed and parts being broken away and in section to more clearly illustrate structural details.

Fig. 3 is a diagrammatic plan view illustrating two of my machines employed in excavating, one of the machines loading the material excavated in wagons or the like, and the other machine being employed in back filling.

Fig. 4 is a side elevational diagrammatic view of a machine illustrating the manner in which the same may be employed for back filling, and for storing materials adjacent the main frame while waiting for the wagons, and Fig. 5 is a front view of the operating levers, the same being detached from the main frame and the control rods connected therewith being shown in cross section.

In general, the excavating and loading machine comprises a main frame, a skip-way carried by the main frame and having a section disposed therebeneath and a section upwardly inclined at one side thereof, a scoop or conveying member, means carried by the main frame for moving the scoop or conveying member toward and away from the main frame and through the skip-way to a discharging or dumping position at the upper end of the skip-way, means for dumping and vibrating or shaking the scoop or conveying member when it reaches its discharge position, and means for rendering the means for moving the scoop or conveying member inoperable when the same has reached its dumping or discharging position.

The frame comprises a rectangular base or frame 8 transportably mounted upon rear drive wheels 9 and front guide wheels 10, the guide wheels 10 having their axle 11 in swivel connection with a standard 12 secured to the frame 8. A motor 13 is mounted upon the truck frame and connected as hereinafter described with a drive shaft 14, which is connected by suitable clutch mechanism with the rear drive wheels 9, as will be later described. The motor 13 and the hoisting or power drum, to be later described, are covered by a roofing 15 carried by uprights 16 secured at their lower ends to the frame 8.

Projecting centrally from one side of the truck or main frame is a pair of truss frames or braces, each including an upper outwardly inclined angle iron 17 secured, as at 18, to the roofing 15, and having its outer end secured to a bearing member 19, a lower longer angle iron 20 also having its outer end secured to the bearing bracket 19 and its inner end secured as at 21 to the truck frame 8. The angle irons 17 and 20 are medially braced by a pair of transverse cross or diagonal braces 22, having their ends secured to the angle irons, as at 23, and secured together at their points of intersection, as at 24. Journally carried by the bearing brackets 19 is a guide or idler pulley 25, around which a hoisting or hauling cable 26 is trained, said cable having one end connected with a yoke 27 of a scoop or conveying member 28, as at 29, and its other end secured to and wound about a hoisting or hauling drum 30 in geared connection with the driven shaft 14, as will be later described.

A two-part skip-way is carried by the main frame or truck for guiding the scoop 28 thereunder and then up to discharging position. The skip-way includes two sections, one section 31 having its inner end curved and pivotally connected, as at 32, to a base frame 33 secured to the frame 8. The section 31 is at all times slightly spaced from the ground's surface, and when the machine is being moved from one place to another, the outer free end of the section 31 is elevated by means of a cable 34, having one end connected to the free end of the section 31, and its other end wound about a drum 35 controlled by a handle 36. The other section 37 has its inner end pivoted, as at 32', with the frame 33, and has its outer upper end adjustably connected with the angle iron members 20 by means of a perforated plate 38 secured, as at 39, to the upper outer end of the section 37 and having a locking or securing bolt 40 carried by the angle irons 20 engaging one of the perforations of said plate. By this structure the discharge end of the skip-way may be adjusted to suit the height of wagons or other vehicles into which the scoop 28 is adapted to discharge.

Connected, as at 41, to the rear closed end of the scoop 28 is a retrieving line or cable 42 which is trained about an anchored idler pulley 43 and then secured at its other end to a retrieving drum 44, loosely journalled upon the driven shaft 14. The drum 44 is provided with a suitable clutch mechanism 45 for coupling the same with the driven shaft 14 upon the movement to the right, with reference to Figure 2, of a lever 46. The lever 46 has pivoted, as at 47, one end of a connecting rod 48 having its other end pivoted to the top end of a medially pivoted lever 49, connected with the clutch mechanism 45, as at 50. Thus it will be seen that when the lever 46 is shifted to engage the clutch mechanism 45, the drum 44 will be rotated to retrieve or move the scoop 28 away from the main frame or truck frame 8, and that when the drum 30 is connected with the shaft 14, by means to be later described, the retrieving drum 44 is disconnected from the clutch mechanism 45 so that the same will be free to unwind the cable 42 therefrom.

The drum 30 has its shaft journalled in bearings 30' secured to the frame 8 and has secured thereto a pair of gears 51 and 52, the gear 51 being of less diameter than the gear 52, and in mesh with a gear 53 loosely journalled on the shaft 14. The larger gear 52 is also in mesh with a gear 54 loosely journalled on the shaft 14, and suitable clutch means are provided for selectively connecting either gear 53 or 54 with the shaft 14, whereby the drum 30 will be driven at various speeds by reason of the different ratios of gearing as described. A double clutch mechanism 55 is mounted upon the shaft 14 intermediate gears 53 and 54, and adapted, when moved to the left of the position depicted in Figure 2, to connect gear 53 with the shaft 14 and rotate the drum 30 at a relatively high rate of speed, and when moved to the right of the position depicted in Figure 2 to engage the gear 54 with the shaft 14 and rotate the drum 30 at a speed substantially less than that when gear 53 is coupled with shaft 14. When the clutch mechanism 55 is in the position depicted in Figure 2, centrally of the gears 53 and 54, the drum 30 will be free to rotate irrespective of the shaft 14. The drum 30 is in this position when the retrieving drum 44 is in drive connection with shaft 14.

The means for operating the clutch mechanism 55 comprises a lever 56, pivoted, as at 57, to the frame 8, and having its lower end pivotally connected, as at 58, to the clutch mechanism 55, and its upper end pivotally connected, as at 59, to one end of a link or rod 60 connected to a control lever 61. The control lever 61 has a lower crank arm 62 formed thereon, having its outer end pivotally connected with a rod 63, having its upper end in pivotal connection with one arm of a bell crank lever 64, and having its other arm pivotally connected with an operating rod 65, connected with an automatic clutch throwout, to be later described.

When it is desired to move the machine from one place to another under its own motive power, the drive wheels 9 are connected with the shaft 14 through the medium of gearing 66 which is connected with a pair of opposed beveled gears 67 and 68 loosely journalled upon the shaft 14. When the gear 67 is operably connected with the shaft 14 by means of clutch mechanism 69, the machine will be moved in a direction to the right with reference to Figure 2, and when the gear 68 is operably connected with the shaft 14 through the medium of its clutch mechanism 70, the machine will be moved in the opposite direction. By this structure I obtain a movement of the machine in either direction, and such movement is controlled by a control lever 71, which has pivoted thereto, as at 72, a rod or lever 73 having one end pivoted, as at 74, to one end of a lever 75 medially pivoted to the frame 8, having its other end pivoted as at 76 to the clutch mechanism 70. The end of said lever 73 extended to the left with reference to Figure 2, is pivoted, as at 77, to a lever 78, medially pivoted to the frame 8, pivotally connected, as at 79, to the clutch mechanism 69. Thus, it will be seen that the movement of the lever 61 to the right or left with reference to Figure 1, will operably connect either of the clutch mechanism 69 or 70.

The levers 46, 61 and 71 have their lower ends journalled upon a common shaft 80, fixed in brackets or bearing members 81 secured to a platform or flooring 82 carried by the portion of the truck frame 8 outwardly of the roofing 15. The platform 82 is enclosed by railings 83 which prevent the accidental falling of the operator from the platform.

When the machine is being used as an excavating and loading machine, the scoop member 28 is moved away from the main frame by the retrieving cable 42 to a position near where it is wished to remove material, when the drum 44 is disconnected from the shaft 14 and lever 61 manipulated to connect the drum 30 with the shaft 14, which action will cause the scoop 28 to dig into the ground and excavate the material. When the scoop 28 is filled it will continue on its course and be guided to the skip-way section 31 by means of the idler pulley or wheel 84, journally mounted between the pair of brackets 85 fixed to the frame 8 centrally over the curved portion of the section 31. The scoop 28 will pass through the section 31 and then up section 37 until its forward edge or end 86 strikes or engages the end 87 of the spring trip 88 disposed beneath the section 37 adjacent its upper discharge end.

The trip 88 is slidably mounted within a casing 89, secured to the section 37 and has an extensile spring 90 mounted thereon to normally urge the end 87 to a position juxtaposed the discharge or upper end of the section 37. When the edge 86 of the scoop engages the end 87 of the trip 88, it will resist further movement of the same and the continuous winding of the cable 26 around the drum 30 will raise or move the scoop 28 to the position depicted in Fig. 1, the edge 86 of the scoop and the end 87 of the trip serving as a fulcrum. The scoop 28 will continue its rocking movement on its edge 86 until its other end engages against a transverse rod 91, having its ends slidably mounted in opposed slots 92 formed in the angle irons 17 and having connected therewith a lever 93 pivotally connected with the rod 65, and as the transverse rod 91 is moved outwardly against the action of its spring 94, the clutch mechanism 55 will be disengaged from either of the gears 53 or 54 to disconnect the drum 30 from the shaft 14.

At the moment that the clutch mechanism 55 is disconnected, both springs 94 and 90 are compressed and the end 86 of the scoop 28 is considerably beyond the end of the section 37 and supported by the trip 88, and when the clutch mechanism 55 is disconnected the springs 94 and 90 will throw or move the scoop 28 to the left with reference to Fig. 1 with a pronounced jerk and thus remove any materials therefrom which may have adhered to the scoop. The wagon, vehicle or car 95 which is to be loaded, is positioned adjacent the upper discharge end of section 37, as best shown in Figure 4.

As best shown in Fig. 1, when the scoop 28 leaves the curved portion of section 31 to be guided into section 37, the pulley 84 serves as a guide for the retrieving line or cable 42, and that when the scoop 28 is at the other side of the pulley 84, the same guides the cable 26.

In Fig. 3 of the drawings I have illustrated two of my machines operating jointly on cellar work or the like without interference with each other, one machine designated as at A, being employed for back filling, and the other machine, designated as at B, being employed for loading wagons to haul away the material. With this manner of operation, it is possible to rapidly excavate a cellar and do the necessary back filling and remove the excess material by wagons.

In Fig. 4, I have illustrated a sectional view through the ground showing the cellar C as being partially excavated, the back filling D as having been filled in by material excavated from the cellar C, and a pile of excess material E being shown in dotted lines which is to be loaded into the wagon 95 in the manner hereinbefore described. When one wagon 95 has been filled, and while waiting for another wagon to be loaded, the material may be stored as designated at E until the next wagon is ready.

From the foregoing description taken in connection with the accompanying drawings, it will be readily apparent to those skilled in the art to which an invention of this character appertains, that I have provided an extremely efficient and practical excavating and loading machine which will perform the functions for which it is constructed in a most desirable manner.

What I claim as my invention is:

1. A machine of the class described comprising a main frame, a conveying scoop movable toward and away from the main frame, and a two part skip-way having a section disposed beneath the main frame, and a section upwardly inclined from the section beneath the main frame, the section disposed beneath the main frame being movable to a position spaced from the ground for convenience in transporting the main frame from place to place.

2. A machine of the class described comprising a main frame, a skip-way carried thereby and extending from one side of said main frame under the frame and then upwardly to provide a discharge end elevated from the ground, said skip-way being of substantially U-shape in cross section, a conveyor member, and means for guiding said conveyor member into the skip-way and up to discharging position.

3. A machine of the class described comprising a main frame, a skip-way carried thereby and extending from one side of said main frame under the frame and then upwardly to provide a discharge end elevated from the ground, said skip-way being of substantially U-shape in cross section, a conveyor member, means for guiding said conveyor member into the skip-way and up to discharging position, and an extensible stop carried by the upper end of said skip-way for shaking said conveyor member and dumping the same.

4. A machine of the class described comprising a main frame, a conveying member movable toward and away from the main frame, means for guiding the conveying member under the main frame and then elevating said member, and an extensible stop carried by said guiding means for dumping the conveying member after the same has been elevated, said extensible stop supporting the conveying member when the same is extended.

5. A machine of the class described, comprising a main frame, a conveying member moving toward and away from the main frame, a skip-way section positioned under the main frame, and an upwardly inclined skip-way section forming a continuation of said first section whereby the conveying member is guided beneath the main frame and then up to a discharging position, said last named section being adjustably secured to said main frame, whereby the height of said discharging position may be controlled.

6. A machine of the class described, comprising a main frame, a skip-way formed in two sections, one section being positioned beneath the main frame and the other section upwardly inclined whereby a conveying member will be guided beneath the frame and then up to a discharging position, a common pivot for the adjacent ends of said skip-way sections, and means for adjusting the opposite ends of said sections with respect to the main frame.

7. A machine of the class described, comprising a main frame, a skip-way composed of two sections, one section being disposed beneath the main frame and the other section inclined upwardly at one side of said frame, whereby a conveying member guided into the skip-way will be passed beneath the main frame and then up to a discharging position, a common pivot for the adjacent ends of said skip-way sections, and independent means engageable with the outer ends of said skip-way sections for moving the same on their pivots.

8. In a machine of the class described, the combination with a main frame having a driven drum mounted thereon, a skip-way carried by the main frame and having a portion inclined upwardly and outwardly from the main frame and a conveying member connected with said driven drum and adapted to be guided into the skip-way and then up to discharging position, of means carried by said main frame adjacent the upper discharge end of the skip-way and adapted to be engaged by the conveying member upon its movement to a discharging position to render said driven drum inoperative, said means including a slidably mounted lever arranged in the path of the conveying member when in discharging position, means connecting said lever with the drive of said drum, and spring means normally yieldingly urging said lever to an inoperative position.

In testimony whereof, I affix my signature.

LLOYD H. DRAEGER.